United States Patent [19]

Jewett et al.

[11] Patent Number: 5,076,639
[45] Date of Patent: Dec. 31, 1991

[54] PARCEL VAN SEATING

[75] Inventors: Walter W. Jewett, Miami, Fla.; Marc A. Clark, Marginsville, Ind.; William F. Clelland, Columbia, Mo.

[73] Assignee: Ryder Truck Rental, Inc., Miami, Fla.

[21] Appl. No.: 562,480

[22] Filed: Aug. 3, 1990

[51] Int. Cl.$^5$ .......................... B60P 3/00; B60N 2/00
[52] U.S. Cl. .................................. 296/24.1; 296/64; 296/183
[58] Field of Search ................ 296/10, 24.1, 64, 166, 296/183

[56] References Cited

U.S. PATENT DOCUMENTS

| 2,063,388 | 12/1936 | Larsen | 296/64 |
| 2,192,207 | 3/1940 | Stahl | 296/64 |
| 2,278,450 | 4/1942 | Jones | 296/24.1 |
| 3,455,597 | 7/1969 | Sherbert et al. | 296/64 |
| 3,954,296 | 5/1976 | Patnode | 296/10 |
| 4,093,301 | 6/1978 | Kwok | 296/166 |

FOREIGN PATENT DOCUMENTS

| 0271259 | 6/1988 | European Pat. Off. | 296/24.1 |
| 822656 | 11/1951 | Fed. Rep. of Germany | 296/24.1 |
| 1178641 | 9/1985 | U.S.S.R. | 296/24.1 |
| 1405772 | 9/1975 | United Kingdom | 296/24.1 |

Primary Examiner—Dennis H. Pedder
Attorney, Agent, or Firm—Laff, Whitesel, Conte & Saret

[57] ABSTRACT

An improved parcel van provides two additional passenger seats within the cargo section of the van. A bulkhead wall defines an additional passenger seating area in the portion of the cargo section immediately adjacent the cab. The bulkhead separates the additional seating area from the remainder of the cargo section. The additional seating area includes a downwardly projecting channel running parallel to the long axis of the vehicle. The additional seats face inward toward the channel. The channel provides space for the legs of the additional passengers and creates a walkway between the cab section and the cargo section. The backs of the additional seats may be folded down so that a significant portion of the additional seating area may be used to store appropriately secured cargo when the additional seating is not required.

6 Claims, 3 Drawing Sheets

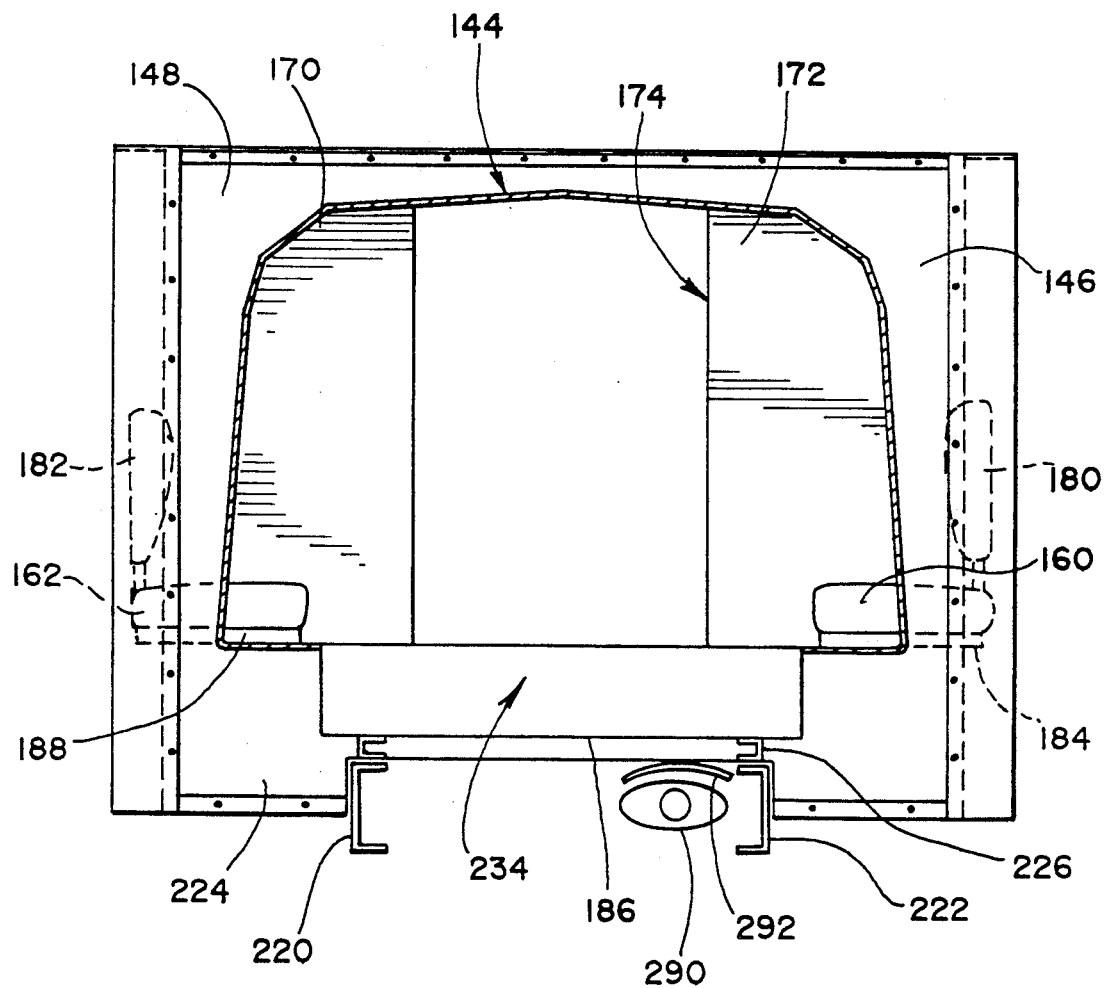

PARCEL VAN SEATING

BACKGROUND OF THE INVENTION

This invention relates to motor vehicles, and more particularly to passenger seating in trucks and vans.

A variety of medium sized "parcel vans", also known as "R.V. cutaway" or "cutaway vans", are now available for use by delivery services and for the transport of household items. A typical example of such vans is built on a van chassis and includes a cab section and a cargo section. The cab section includes the engine, operator controls, and forward-facing seating for a driver and usually only one passenger. The cargo section is a generally box-like structure immediately behind the cab. The cargo section has a roof height substantially greater than that of the cab section. An additional cargo portion typically extends forward over the cab roof from the main cargo section. A doorway between the cab and cargo sections on some parcel vans permits access between these sections from within the van.

While such vans have achieved great popularity with users, they suffer from insufficient passenger seating in certain applications. For example, when used by a family to transport their own household goods from one location to another (i.e. in a "do-it-yourself" moving application), it is frequently desireable for more than two persons to accompany the goods. For long distance moves, alternate transportation for the additional persons may be expensive or unavailable. Even for relatively short moves, it may be extremely inconvenient to separately transport additional persons from one location to another.

Accordingly, in modern parcel vans, the need exists for safe and comfortable passenger seating in addition to that currently provided. While in some vehicles, an additional seat might be placed in the cab between the two existing seats, the additional seat would unacceptably block access to the doorway between the cab and the cargo area. In addition, due to the configuration of existing cabs, leg room for such an additional seat would be insufficient to provide an adequate level of passenger comfort. An alternative would be to merely install ordinary fixed seats in the cargo section, but this alternative would lack an appropriate separation between the passengers and the cargo, and would fail to provide adequate circulation of air either through the factory-installed windows or the air conditioner. Other alternatives could include temporary makeshift "seats" such as milk crates or furniture pads in the cargo and/or cab area. These alternatives are uncomfortable, not aesthetically pleasing, and could be unsafe. For example, such temporary makeshift "seats" lack appropriate safety restraints and may otherwise fail to conform to federal motor vehicle safety standards.

In practice, parcel vans are typically constructed by a customizing manufacturer by adding an appropriate custom-designed cargo section to a truck or van chassis obtained from an original vehicle manufacturer. Because the vehicle manufacturer supplies the cab section, including seating that complies with applicable federal safety standards, it is preferable that only minimal changes be made to that section. In order to achieve user and fleet operator acceptance, the additional seating must be safe and comfortable, and must not result in a substantial reduction of cargo capacity.

OBJECTS AND SUMMARY OF THE INVENTION

It is therefore an object of the present invention to provide a parcel van having additional safe and comfortable passenger seating while maximizing cargo storage space.

It is another object of the invention to provide a flexible seating arrangement for a parcel van to increase the amount of safe and comfortable passenger seating while permitting seating space unused by additional passengers to be used for cargo storage, provided the cargo is properly and safely packed and secured.

It is a further object of the invention to provide a multipurpose section suitable for addition to a truck or van chassis in which both cargo carrying space and safe and comfortable seating for additional passengers are provided.

An improved parcel van according to the present invention provides two additional passenger seats within the cargo section of the van. A bulkhead wall defines an additional passenger seating area ("APSA") or compartment in the portion of the cargo section immediately behind the cab. The remainder of the cargo section—i.e. that portion of the cargo immediately behind the APSA—is referred to as the "load area". The bulkhead wall separates the APSA from the load area to segregate passengers from the cargo stored in the load area. A sliding door in the bulkhead wall permits access between the APSA and the load area. A substantially widened passageway is provided between the cab and the APSA, permitting access therebetween and promoting the impression that the cab and APSA form a single passenger compartment.

The APSA includes a step well comprising two horizontal planar surfaces adjacent the vehicle side walls and a downward-projecting channel or well running parallel to the long axis of the vehicle. Each horizontal planar surface provides a mounting position for a corresponding additional passenger seat. The additional seats face inward toward the channel. The downward-projecting channel provides space for the legs of the additional passengers and creates a walkway between the cab section and the APSA and load area. The backs of the additional seats may be folded down. A significant portion of the APSA may be used to store cargo when the additional seating is to required, again, provided that the additional cargo is properly and safety packed and secured.

Thus, the invention provides an improved parcel van having safe and comfortable seating for additional passengers. The additional seating requires only a relatively small reduction in cargo capacity, and at least some of this capacity is replenished in the cargo section above the cab. The seating arrangement is flexible so that when the additional seating is not required, the space may be used to store appropriately secured cargo.

BRIEF DESCRIPTION OF THE DRAWINGS

These and other features of this invention will be best understood by reference to the following detailed description of a preferred embodiment of the invention, taken in conjunction with the accompanying drawings, in which:

FIG. 6 is a front cross section view of the parcel van taken along section lines 6—6 of FIG. 4.

DETAILED DESCRIPTION OF THE PREFERRED EMBODIMENT

FIGS. 1, 2, 4, and 6 generally illustrate a parcel van 100 according to the present invention, in which safe seating is provided for two additional passengers. The advantages of the invention will be most apparent when these figures are compared with FIG. 3, which illustrates a prior art parcel van 300 of the type discussed herein.

Figure 3:
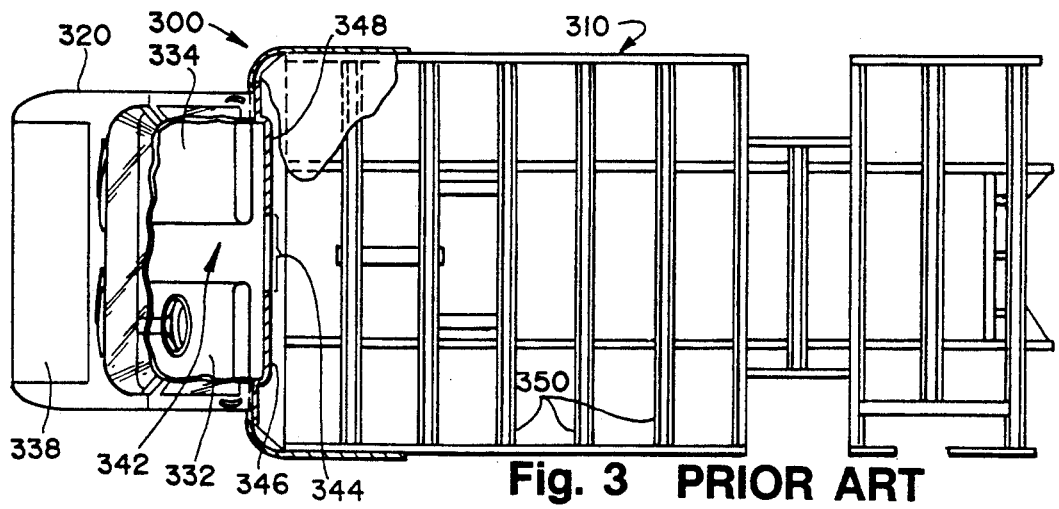
FIG. 3 is a cross section view of a prior art parcel van taken along a section line equivalent to the section lines 2—2 of FIG. 1.

As illustrated in FIG. 3, the prior art parcel van 300 has a cab section 320, and a cargo section 310. The cab section 320 preferably comprise a power plant 338 and a passenger seating area 342. The passenger seating area 342 includes a driver's seat 332 and a passenger seat 334, along with appropriate controls for operating the vehicle. A bulkhead-type wall, comprising left and right portions 346, 348, separates the passenger seating area 342 from the cargo section 310. A doorway 344 formed between the bulkhead wall portions 346, 348 provides access between the passenger seating area 342 and the cargo section 310.

Prior-art parcel vans are typically constructed by adding an appropriate customized cargo section 310 to a van chassis obtained from a vehicle manufacturer. Structural members 350 provide support for the cargo section 310 on the truck or van chassis. The cargo section 310 usually has a roof height substantially greater than that of the cab section 320. An extension or peak area (not shown in FIG. 3) of the cargo section 310 protrudes forward above a portion of the cab section 320, enclosing for cargo storage use a region above the cab 320 between the roof lines of the cab and cargo sections.

Figure 1:
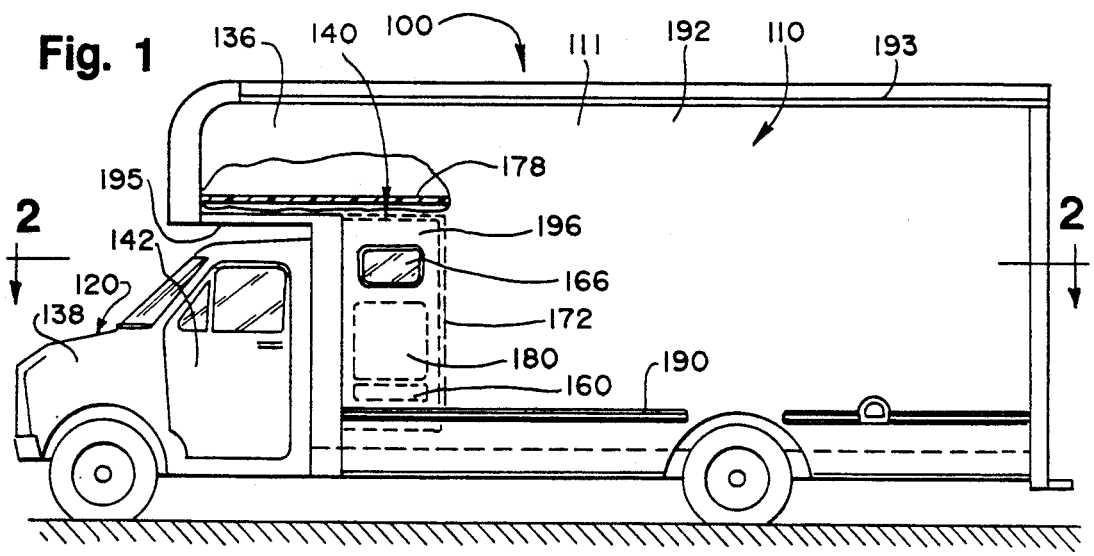
FIG. 1 is a side elevation view of a parcel van constructed according to the present invention.
Figure 2:
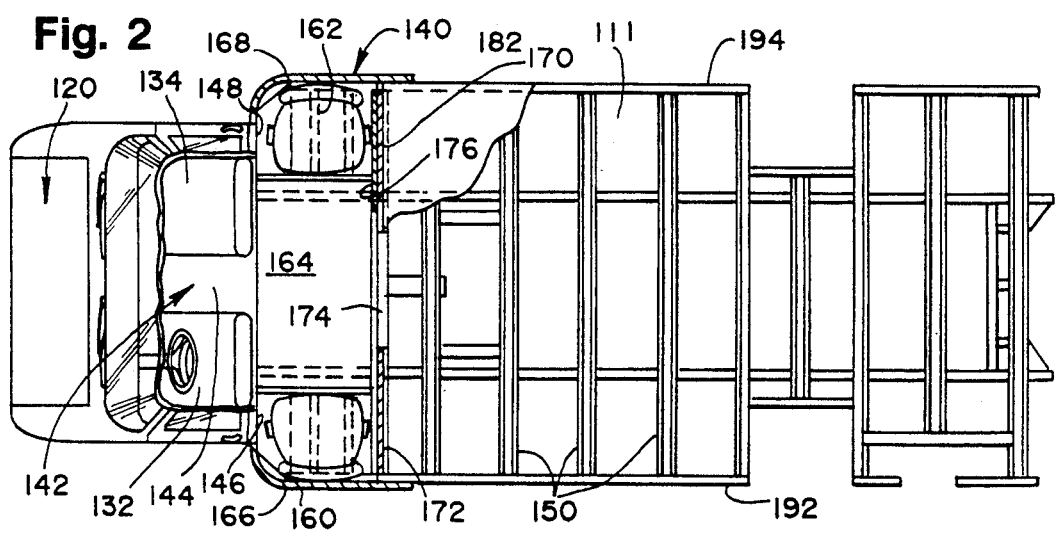
FIG. 2 is a cross section view of the parcel van taken along section lines 2—2 of FIG. 1.

As shown in FIGS. 1 and 2, the parcel van 100 according to the present invention has an external appearance similar to that of the prior art van 300. The inventive van includes a cab section 120 having a power plant 138 and a passenger seating area 142, and a cargo section 110 having an extension 136 over the passenger seating area 142. The cargo section 110 is supported by structural members 150. The cargo section has a left side wall 192 (from the driver's perspective), a right side wall 194, a floor 190, and a roof 193. While this specification describes the parcel van 100 as including a cargo section extension 136, the invention could be advantageously applied to vans lacking such an extension.

An additional passenger seating area (APSA) 140 is defined within a portion of the cargo section 110 adjacent the cab to provide safe and comfortable seating for at least two additional passengers, as shown in FIG. 2. Since the cargo section 110 provides both cargo and seating areas, it can be considered a multipurpose section, but for simplicity will usually be referred to as a "cargo section" herein. The APSA 140 contains a left seat 160 and a right seat 162 to accommodate the two additional passengers. The seats 160, 162 are disposed adjacent the cargo section side walls 192, 194 and preferably face the long axis of the van—i.e. the seat backs are parallel to the side walls. In this manner, the two cab seats retain their full forward/aft travel and adjustment capabilities and do not interfere with the additional seating.

The APSA 140 is separated from the passenger area 142 of the cab section 120 by a separator wall comprising left and right portions 146, 148, respectively, which are disposed perpendicular to the long axis of the van. The wall portions 146, 148 define an opening 144 (FIG. 6) to permit easy access between the cab section passenger area 142 and the APSA 140. In contrast to prior art vans, some of which have been constructed with a relatively small rectangular doorway between the cab and cargo sections, the wall portions 146, 148 are substantially abbreviated. Thus, opening 144 is relatively large, creating virtually no barrier to movement or vision between the passenger area 142 of cab section 120 and the APSA 140, and promoting the impression that the cab passenger seating area 142 and the APSA 140 form a single passenger compartment.

Figure 4:
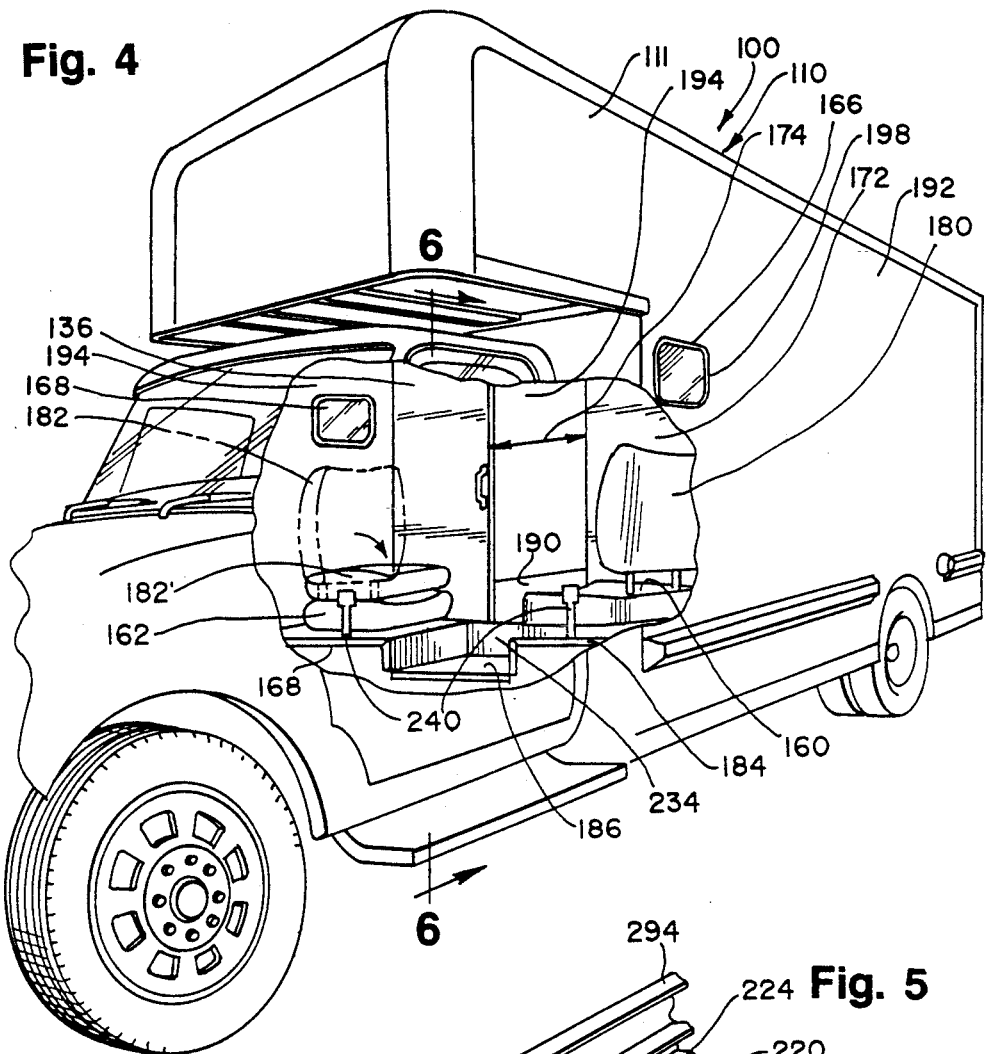
FIG. 4 is a perspective view of the parcel van of FIG. 1, taken from a point near the left front wheel, and showing a portion of the outer vehicle surface cut away to more clearly illustrate the interior configuration.

The portion of the cargo section 110 not allocated to the APSA 140—i.e. that portion of the cargo section available for cargo storage—is referred to as the load area 111. The APSA 140 is separated from the load area 111 of the cargo section 110 by a bulkhead wall comprising left and right portions 172, 170, respectively, which are also disposed perpendicular to the long axis of the van. The bulkhead wall portions 172, 170 define a door opening 174 to permit access between the APSA 140 and load area 111. A sliding door 176 has a closed position in which it blocks opening 174, thereby separating the passengers from the cargo. The sliding door 176 has an open position permitting access between the APSA 140 and the load area 111. In its open position, door 176 could be on either the right-hand side of door opening 174, as shown in FIGS. 2 and 4, or on the left hand side (not shown). The bulkhead wall portions 170, 172, and the sliding door 176, are preferably constructed of fiberglass-reinforced plywood or a similar appropriate sheet material.

A flat member 196 (FIG. 1) substantially co-planar with the bottom 195 of the cargo section extension 136 forms the ceiling of the APSA 140 (FIG. 1). As a result, the space above the APSA 140, which was previously a part of the main portion of the cargo section 110, effectively becomes a part of the cargo section cab extension 136. The extension 136 is effectively lengthened by an amount equal to the length of the APSA 140 (with respect to the long axis of the van). Hence, the space above the APSA 140 may be used for certain cargo storage. An appropriate floor sheet 178 is provided for the cargo section extension 136. The floor sheet 178 may be constructed of fiberglass-reinforced plywood, aluminum, steel or any other appropriate rigid sheet material.

A rectangular, downwardly projecting, U-shaped channel or well 186 (FIGS. 4, 5) forms the floor of the APSA 140. The U-shaped channel 186 provides room for the legs of passengers seated in seats 160, 162, and also serves as the access walkway between the cab passenger seating area 142 (FIGS. 1, 2) and the load area 111. The U-shaped floor channel 186 (FIG. 5) is preferably constructed from galvanized steel or another appropriate sturdy, rust-resistant material.

Figure 5:
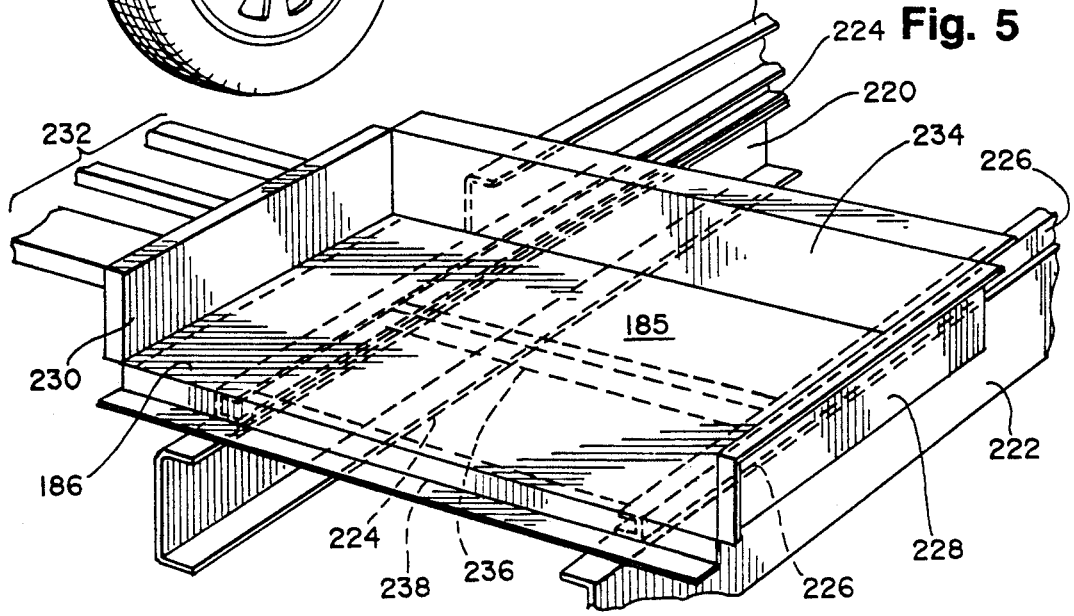
FIG. 5 is a perspective view of a floor plan for an additional passenger seating area for the parcel van of FIG. 1.

Details of the floor channel 186 and its mounting are shown in greater detail in FIG. 5. The bottom surface 185 of the channel 186 is essentially parallel to the road surface. Left and right vertical surfaces 228, 230 respectively, extending from the bottom surface of the floor channel 186, are disposed parallel to the cargo section walls 192, 194. A rear surface 234, also extending from the bottom surface of the floor channel 186, is disposed parallel to bulkhead wall portions 170, 172. The rear surface acts as a threshold between the APSA floor channel 186 and the floor 190 (FIG. 4) of the load area 111. The cargo section floor 190 is several inches above the bottom surface 185 of the floor channel 186, creating a step at the interface thereof.

Structural members 220 and 222 (FIG. 5) are longitudinal frame rails which form a part of the truck chassis. These members terminate behind the rear surface 234 of floor channel 186. Members 224, 226 are spacer channels which are disposed between the parcel van body and the underlying truck chassis. Members 224, 226 are conventionally attached to members 220, 222 respectively, and extend forward under floor channel 186. A first parcel van body rail 294 and a second parcel van body rail (not shown) provide structural support for the cargo section. Cross members 236, 238 extend perpendicularly between and are conventionally attached to members 224, 226, thereby providing additional support to floor channel 186.

Right-side seat support members 232 extend between the floor channel right vertical surface 230 and the right side wall 194 of the cargo section to provide structural support for the right-hand additional passenger seat 162 (FIG. 4). Similar seat support members (not shown) extend between the floor channel left vertical surface 228 and the left side wall 192 of the cargo section to support the left-hand additional passenger seat 160. The seat support members are substantially coplanar with floor 190 of the cargo section.

Additional passenger seats 160, 162 may be any appropriate comfortable vehicle seats meeting applicable federal motor vehicle safety standards. Preferably, seats 160, 162 have "seat backs" or upper portions 180, 182 respectively, which are hinged so that they may be folded forward when not in use. In FIG. 4, left hand seat back 182 is shown in dark lines in its folded-over "storage" position 182', and in dotted lines in its normal "upright" position. The storage position permits van users to store cargo on top of the seats 160, 162 When the seats are not needed for passengers, provided that the additional cargo is properly and safely packed and secured. In the folded position, the passenger-contact portions of the seats, such as cushions and fabric coverings, are protected from wear and soiling which might occur from contact with cargo stored thereon.

Seats 160, 162 are preferably equipped with appropriate safety restraints 240, such as lap belts. Seats 160, 162 are conventionally attached to seat support members 232.

Courtesy surfaces 184, 188 (FIGS. 4 and 6) are horizontal sheets disposed between the seats 160, 162 and the support members 232, and extend between floor channel vertical members 228, 230 and cargo section side walls 192, 194. The courtesy surfaces 184, 188 provide a barrier between the APSA 140 and the vehicle underside, and promote a pleasing appearance in the passenger areas. The courtesy surfaces 184, 188 are preferably constructed of fiberglass-reinforced plywood or a similar appropriate sheet material.

In some vehicles, additional environmental barriers may be required, depending on the presence of nearby items which may have an adverse effect on APSA materials or occupants. For example, FIG. 6 shows a heat shield 292 protecting the courtesy surface 184 and floor channel 186 from the excess heat generated by an exhaust muffler 290. Heat shield 292 is preferably constructed of heat resistant material.

The APSA 140 preferably includes a variety of additional features to promote safety and comfort of the occupants. Windows 166, 168 (FIG. 4) are desirably provided in side walls 192, 194. The windows 166, 168 are preferably constructed of a safety glass or other appropriate shatter-resistant glazing material. The windows 166, 168 may be mounted in window apertures in the side walls using rubber glazing gaskets 198. An appropriate carpet (not shown) or other soft sheet material is preferably applied to ceiling, wall, and corner surfaces. The carpet protects occupants who may accidentally contact these surfaces. The carpet may also reduce noise in the passenger areas and promote a pleasing appearance.

An appropriate cargo net (not shown) may be positioned behind the driver's and front passenger's seats to help prevent cargo stored in the APSA from intruding into the cab passenger seating area 142.

Thus, a parcel van has been disclosed which provides safe, comfortable and aesthetically pleasing seating for additional passengers. The seating arrangement is flexible, so that the additional seating area may be used to store appropriately secured cargo when not required for passenger use. The additional passenger seating is provided while minimizing the reduction in available cargo storage space. A cargo section incorporating additional seating according to the invention may be added to a truck or van chassis available from several commercial manufacturers. Although the invention has discussed additional seating for two, the same principles can be applied for additional seating for more than two persons by enlarging the APSA and U-shaped channel and providing additional seats.

The above-described embodiment of the invention is merely one example of a way in which the invention may be carried out. Other ways may also be possible, and are within the scope of the following claims defining the invention.

What is claimed is:

1. A parcel van comprising:
a cab section having a front and a rear, said cab section including a power plant, spaced side walls, seating for passengers between said side walls, a first roof over said seating and between said side walls, and a separator wall at the rear of said cab section, said separator wall having an access opening of a height substantially equal to a height of said separator wall; and
an attached multipurpose section at the rear of said cab section, said multipurpose section having spaced side walls and a second roof at a height different than said first roof, said multipurpose section further having a first compartment for carrying cargo and a second compartment between said cab section and said first compartment, said first compartment having a first cargo floor extending rearwardly from said second compartment, said second compartment having supplemental seating means and a downwardly projecting channel adjacent to and below a lowermost surface of said supplemental seating means to provide foot room for said supplemental seating means and to provide a walkway between said cab section and said first compartment, said channel terminating in a supplemental seating area floor which is in a plane below the plane of said first cargo floor, and a bulkhead wall between said first and second compartments, said bulkhead wall having an opening of a height substantially equal to a height of said bulkhead wall.

2. The parcel van of claim 1 wherein said openings in said bulkhead wall and said separator wall and said channel are coaxially aligned along a longitudinal axis of the van.

3. The parcel van of claim 1 wherein said first compartment also has a second cargo floor extending forwardly from said bulkhead wall over said first roof of said cab section, to provide cargo storage space extending continuously above both said first and second cargo floors, and wherein said bulkhead wall extends vertically between said second cargo floor and said first cargo floor.

4. The parcel van of claim 1 wherein said supplemental seating means include a pair of seats on opposite sides of said channel which face inwardly toward each other.

5. The parcel van of claim 1 wherein said channel is intermediate said side walls of said multipurpose section.

6. The parcel van of claim 5 wherein the spacing between said side walls of said multipurpose section is greater than the spacing between said side walls of said cab section for the entire height of said cab section side walls.

* * * * *